(12) United States Patent
Jun

(10) Patent No.: US 9,278,613 B2
(45) Date of Patent: Mar. 8, 2016

(54) POWER TRANSMISSION SYSTEM OF HYBRID ELECTRIC VEHICLE

(71) Applicant: HYUNDAI MOTOR COMPANY, Seocho-gu, Seoul (KR)

(72) Inventor: You Kwang Jun, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/512,209

(22) Filed: Oct. 10, 2014

(65) Prior Publication Data
US 2015/0184721 A1 Jul. 2, 2015

(30) Foreign Application Priority Data
Jan. 2, 2014 (KR) .......................... 10-2014-0000271

(51) Int. Cl.
*F16H 37/04* (2006.01)
*B60K 6/44* (2007.10)

(52) U.S. Cl.
CPC ................ *B60K 6/44* (2013.01); *Y10S 903/919* (2013.01); *Y10T 74/19014* (2015.01)

(58) Field of Classification Search
CPC .. B60K 6/48; B60K 2006/4825; F16H 3/089; F16H 59/02
USPC ...................... 74/661, 665 A, 665 B
See application file for complete search history.

(56) References Cited

U.S. PATENT DOCUMENTS

| 7,789,786 | B2 * | 9/2010 | Fujita ....................... | B60K 6/26 475/160 |
| 7,950,485 | B2 * | 5/2011 | Fukumura .............. | B60K 6/365 180/170 |
| 8,143,861 | B2 * | 3/2012 | Oyobe ................... | B60K 6/445 123/247 |
| 8,215,425 | B2 * | 7/2012 | Hayashi ................. | B60K 6/445 180/65.265 |
| 8,439,782 | B2 * | 5/2013 | Sugino .................... | F16H 3/725 475/282 |
| 2012/0203414 | A1 | 8/2012 | Akutsu et al. | |

FOREIGN PATENT DOCUMENTS

| JP | 2003-111205 A | 4/2003 |
| KR | 10-2002-0066949 A | 8/2002 |
| KR | 10-2009-0035008 A | 4/2009 |

* cited by examiner

*Primary Examiner* — Ha D Ho
(74) *Attorney, Agent, or Firm* — McDermott Will & Emery LLP

(57) ABSTRACT

A power transmission system of a hybrid electric vehicle includes an input shaft configured to receive torque of an engine. A first motor/generator includes a first rotor directly connected to the input shaft and a first stator selectively connected to a first motor housing and the input shaft. An intermediate shaft is disposed in series with the input shaft and selectively connected to the first stator. A second motor/generator includes a second rotor directly connected to the intermediate shaft and a second stator directly connected to a second motor housing. A final reduction gear is configured to receive torque from the intermediate shaft and to output the torque. A battery supplies electricity to the first and second motor/generators or is charged by torque of the first and second motor/generators.

11 Claims, 8 Drawing Sheets

FIG. 2

| Mode | BK | CL1 | CL2 |
|---|---|---|---|
| EV mode | | | |
| Engine starting during EV mode | ● | | |
| Series mode after engine starting | ● | | |
| HEV mode (charging battery) | | ● | |
| HEV mode (discharging battery) | | ● | |
| Engine mode | | ● | ● |

POWER TRANSMISSION SYSTEM OF HYBRID ELECTRIC VEHICLE

CROSS-REFERENCE TO RELATED APPLICATION

This application claims the benefit of priority to Korean Patent Application No. 10-2014-0000271 filed in the Korean Intellectual Property Office on Jan. 2, 2014, the entire contents of which are incorporated herein by reference.

TECHNICAL FIELD

The present disclosure relates to a power transmission system of a hybrid electric vehicle. More particularly, the present disclosure relates to a power transmission system of a hybrid electric vehicle that can execute engine starting, shifting, and power transmission using two motor/generators and three friction elements.

BACKGROUND

In recent years, an environmentally-friendly vehicle technology has becoming a very important technology in the automotive industry. Vehicle manufacturers have been focusing on development of environmentally-friendly vehicles, such as electric vehicles (EV), hybrid electric vehicles (HEV), and fuel cell electric vehicles (FCEV), to satisfy the environment and fuel consumption regulations.

These eco-friendly vehicles have technical restrictions in terms of weight and cost, and thus, the vehicle manufacturers keep observation on the hybrid electric vehicles for the exhaust gas regulations and improving fuel consumption performance.

A hybrid electric vehicle is a vehicle using more than two power sources. A gasoline or diesel internal combustion engine using fossil fuel and a motor/generator driven by electrical energy are the main power source for the hybrid electric vehicle.

The hybrid electric vehicle uses the motor/generator having relatively low-speed torque characteristics as a main power source at a low-speed and uses the engine having relatively high-speed torque characteristics as a main power source at a high-speed.

Since the hybrid electric vehicle stops the engine operation using the fossil fuel and uses the motor/generator at a low-speed region, fuel consumption may be improved and exhaust gas may be reduced.

However, a power transmission system of the hybrid electric vehicle has different durability, power delivery efficiency, and the size that depends on connections of planetary gear sets, the motor/generators, and a torque delivery apparatus. Therefore, designs for the connection structure of the power transmission system of the hybrid electric vehicle are also under continuous development to achieve robust and compact power transmission system having no power loss.

The above information disclosed in this Background section is only for enhancement of understanding of the background of the invention, and therefore, it may contain information that does not form the prior art that is already known in this country to a person of ordinary skill in the art.

SUMMARY

The present disclosure has been made in an effort to provide a power transmission system of a hybrid electric vehicle having advantages of executing engine starting, shifting, and power transmission using two motor/generators and three friction elements.

A power transmission system of a hybrid electric vehicle according to an exemplary embodiment of the present invention includes an input shaft configured to receive a torque of an engine. A first motor/generator includes a first rotor directly connected to the input shaft and a first stator selectively connected to a first motor housing and the input shaft. An intermediate shaft is disposed in series with the input shaft and selectively connected to the first stator. A second motor/generator includes a second rotor directly connected to the intermediate shaft and a second stator directly connected to a second motor housing. A final reduction gear is configured to receive a torque from the intermediate shaft and to output the torque. A battery supplies electricity to the first and second motor/generators or is charged by a torque of the first and second motor/generators.

The power transmission system may further include a brake disposed between the first stator and the first motor housing. A first clutch is disposed between the first stator and the intermediate shaft. A second clutch is disposed between the input shaft and the first stator.

The brake may be operated when the engine starts at an electric vehicle (EV) mode and at a series mode after the engine starts. The first clutch may operate at a hybrid electric vehicle (HEV) mode, and the second clutch may be operated at an engine mode.

The power transmission system may further include a speed reduction device disposed between the intermediate shaft and the final reduction gear and transmitting the torque of the intermediate shaft to the final reduction gear.

The speed reduction device may include an output shaft disposed in parallel with the intermediate shaft. An output shaft input gear is fixedly connected to an end portion of the output shaft and engaged with an intermediate output gear fixedly disposed on the intermediate shaft. An output shaft output gear is fixedly connected to the other end portion of the output shaft and engaged with the final reduction gear.

A power transmission system of a hybrid electric vehicle according to another exemplary embodiment of the present invention includes an input shaft configured to receive a torque of an engine. A first motor/generator includes a first rotor directly connected to the input shaft and a first stator selectively connected to a first motor housing and the input shaft. An intermediate shaft is disposed in series with the input shaft and selectively connected to the first stator. A second motor/generator includes a second rotor directly connected to the intermediate shaft and a second stator directly connected to a second motor housing. A speed reduction device is disposed in parallel with the intermediate shaft and configured to receive a torque of the intermediate shaft. A battery supplies electricity to the first and second motor/generators or is charged by a torque of the first and second motor/generators. A final reduction gear is configured to receive the torque from the intermediate shaft through the speed reduction device and to output the torque.

BRIEF DESCRIPTION OF THE DRAWINGS

FIG. 2 is an operation chart for a power transmission system according to an exemplary embodiment of the present invention at different driving modes.

DETAILED DESCRIPTION OF THE EMBODIMENTS

Figure 1:
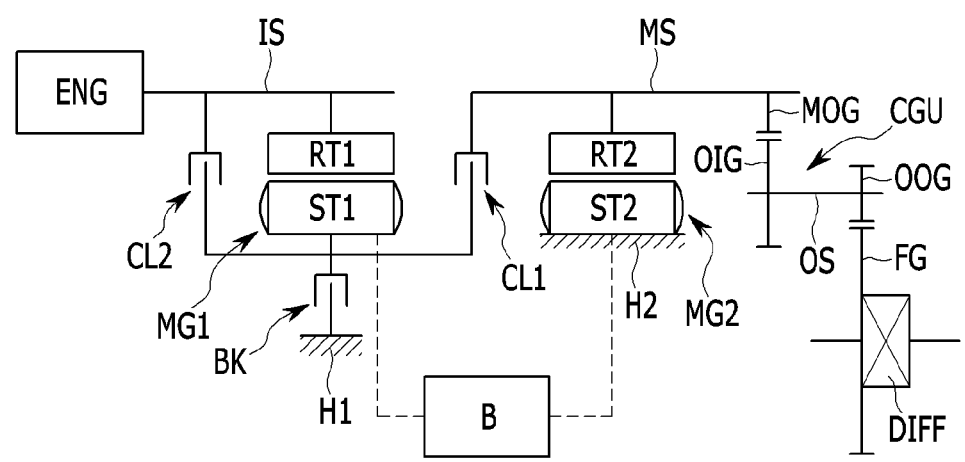
FIG. 1 is a schematic diagram of a power transmission system according to an exemplary embodiment of the present invention.

An exemplary embodiment of the present invention will hereinafter be described in detail with reference to the accompanying drawings.

Description of components that are not necessary for explaining the present exemplary embodiment will be omitted, and the same constituent elements are denoted by the same reference numerals in this specification.

In the detailed description, ordinal numbers are used for distinguishing constituent elements having the same terms, and have no specific meanings.

FIG. 1 is a schematic diagram of a power transmission system according to an exemplary embodiment of the present invention.

Referring to FIG. 1, the power transmission system of a hybrid electric vehicle according to an exemplary embodiment of the present invention includes an input shaft IS, a first motor/generator MG1, an intermediate shaft MS, a second motor/generator MG2, a final reduction gear FG, three friction elements BK, CL1, and CL2, a battery B, and a speed reduction device, clock generation unit (CGU).

The input shaft IS receives torque of an engine ENG. The engine ENG is a power source, and a gasoline engine or a diesel engine using fossil fuel may be used.

Each of the first motor/generator MG1 and the second motor/generator MG2 is an independent power source and is operated as a motor or a generator.

The first motor/generator MG1 includes a first rotor RT1 and a first stator ST1, and is disposed on the input shaft IS receiving the torque of the engine ENG.

The first rotor RT1 is directly connected to the input shaft IS and the first stator ST1 is selectively connected to a first motor housing H1. Therefore, both of the first rotor RT1 and the first stator ST1 can be used as rotors and the first stator ST1 is operated as the stator when the brake BK operates.

The intermediate shaft MS is disposed in parallel with the input shaft IS, one end portion of the intermediate shaft MS is selectively connected to the first stator ST1 of the first motor/generator MG1, and an intermediate output gear MOG is fixedly disposed on the other end portion of the intermediate shaft MS.

The second motor/generator MG2 includes a second rotor RT2 and a second stator ST2, and is disposed on the intermediate shaft MS.

The second rotor RT2 is directly connected to the intermediate shaft MS and the second stator ST2 is fixed to a second motor housing H2.

Each of the first and second rotors RT1 and RT2 includes a rotor core in which permanent magnets are buried so as not for magnetic force to be deteriorated at high temperature, and each of the first and second stator ST1 and ST2 has a stator of concentrated winding type and a rotor position sensor (resolver) for detecting positions of the permanent magnets.

Therefore, the first and second motor/generators MG1 and MG2 generate a driving torque at starting of a vehicle or in an electric vehicle (EV) mode where the vehicle is driven only by a motor at a low speed region and a constant speed region. The first and second motor/generators MG1 and MG2 assist the engine output in a hybrid electric vehicle (HEV) mode and are operated as a generator which converts braking energy into electrical energy at deceleration or braking.

The three friction elements include one brake BK and two clutches CL1 and CL2. The brake BK is disposed between the first stator ST1 and the first motor housing H1, the first clutch CL1 is disposed between the first stator ST1 and the intermediate shaft MS, and the second clutch CL2 is disposed between the first stator ST1 and the input shaft IS.

The frictional elements including the brake BK and the first and second clutches CL1 and CL2 may be a conventional multi-plate friction element of wet type that are operated by hydraulic pressure.

The speed reduction device CGU includes an output shaft OS disposed in parallel with the intermediate shaft MS, and an output shaft input gear OIG and an output shaft output gear OOG fixedly disposed respectively on both end portions of the output shaft OS.

The output shaft input gear OIG is engaged with the intermediate output gear MOG, and the output shaft output gear OOG is engaged with a final reduction gear FG of a differential apparatus DIFF.

FIG. 2 is an operation chart for a power transmission system according to an exemplary embodiment of the present invention at different driving modes, and FIGS. 3 to 8 illustrate a power transmission path at each mode.

Figure 3:
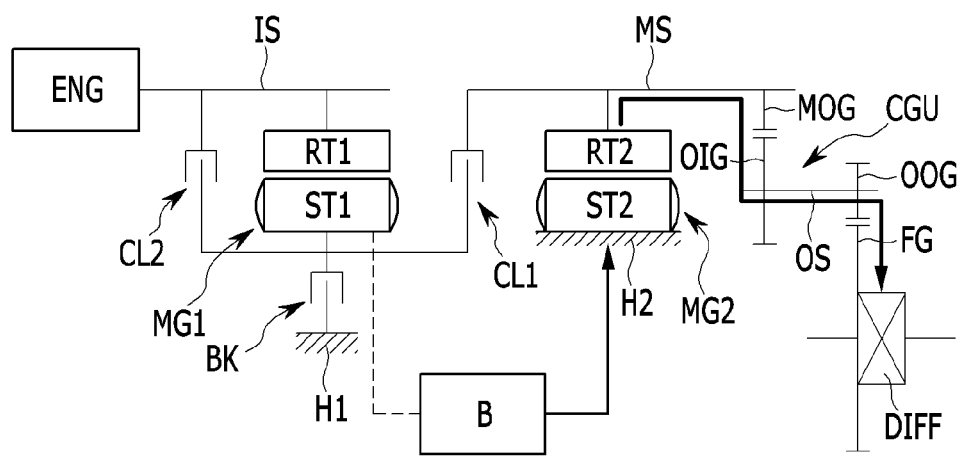
FIG. 3 is a schematic diagram for illustrating a power transmission path in a power transmission system according to an exemplary embodiment of the present invention at an electric vehicle (EV) mode.

In the power transmission system of a hybrid electric vehicle according to the exemplary embodiment of the present invention, as shown in FIGS. 2 and 3, the friction elements BK, CL1, and CL2 are not operated at the EV mode where the vehicle is driven only by the motor at the low speed region or the constant speed region. Therefore, the second motor/generator MG2 generates the driving torque using the battery B power, and the driving torque is transmitted to the differential apparatus DIFF through the speed reduction device CGU and the final reduction gear FD. Therefore, the vehicle runs at the EV mode.

Figure 4:
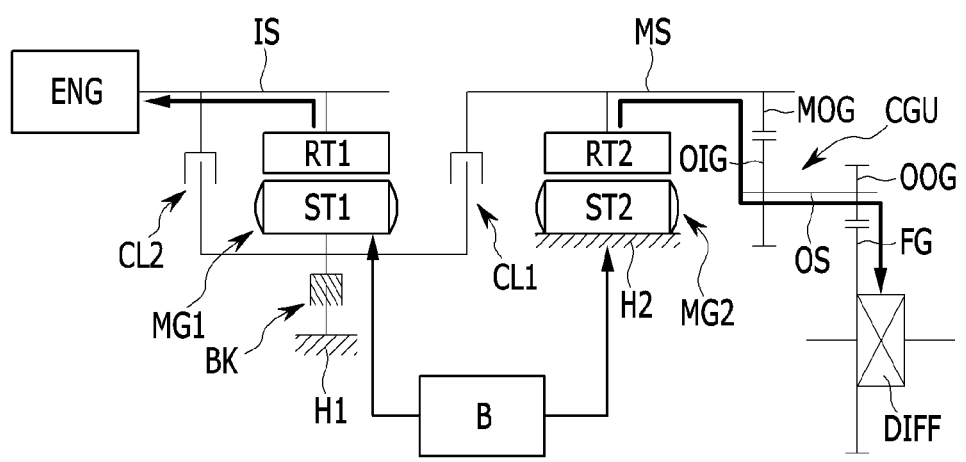
FIG. 4 is a schematic diagram for illustrating a power transmission path in a power transmission system according to an exemplary embodiment of the present invention when an engine is started at the EV mode.

If the engine ENG starts at the EV mode, as shown in FIG. 4, the brake BK operates. In this case, the first stator ST1 is operated as a stator, and the driving torque of the first motor/generator MG1 is transmitted to the engine ENG. Therefore, the engine ENG starts.

Figure 5:
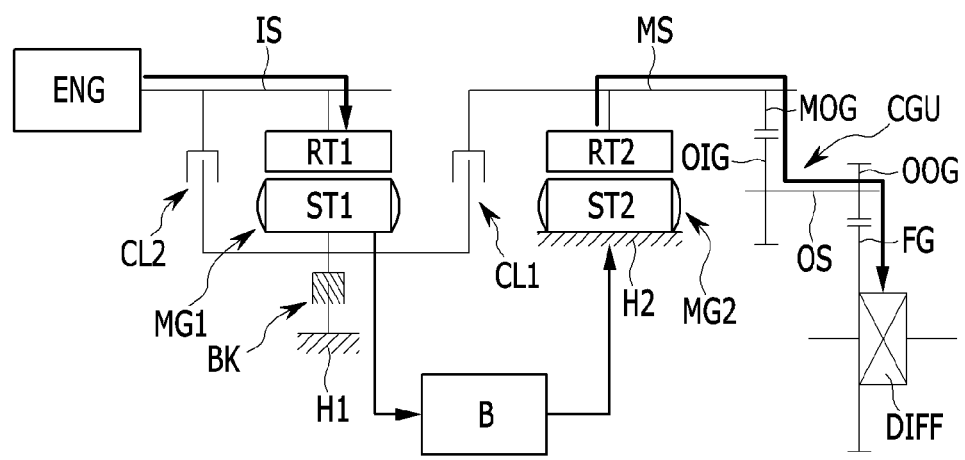
FIG. 5 is a schematic diagram for illustrating a power transmission path in a power transmission system according to an exemplary embodiment of the present invention at series mode after an engine is started.

After the engine ENG starts, as shown in FIG. 5, the first motor/generator MG1 operates as a generator by the torque of the engine ENG so as to generate electrical energy, and the electrical energy is supplied to the second motor/generator MG2 as energy source through an electric path. Therefore, a series mode is achieved.

Figure 6:
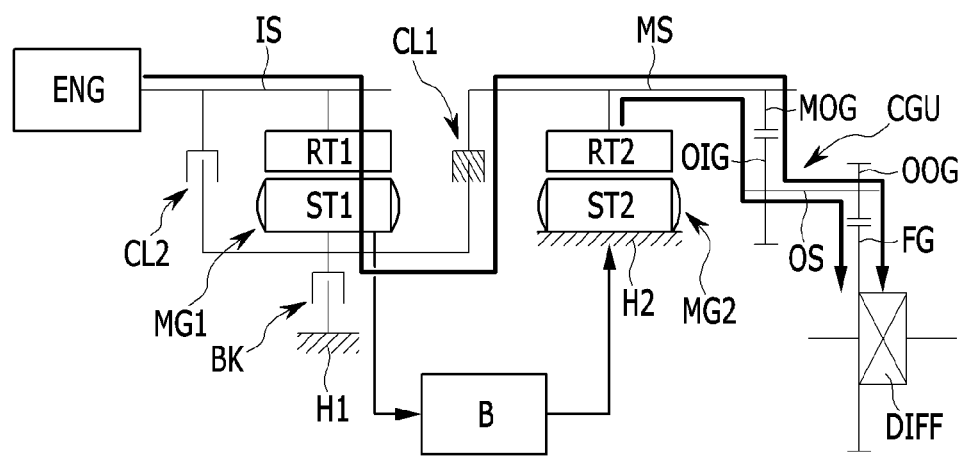
FIG. 6 is a schematic diagram for illustrating a power transmission path in a power transmission system according to an exemplary embodiment of the present invention at a hybrid electric vehicle (HEV) mode.
Figure 7:
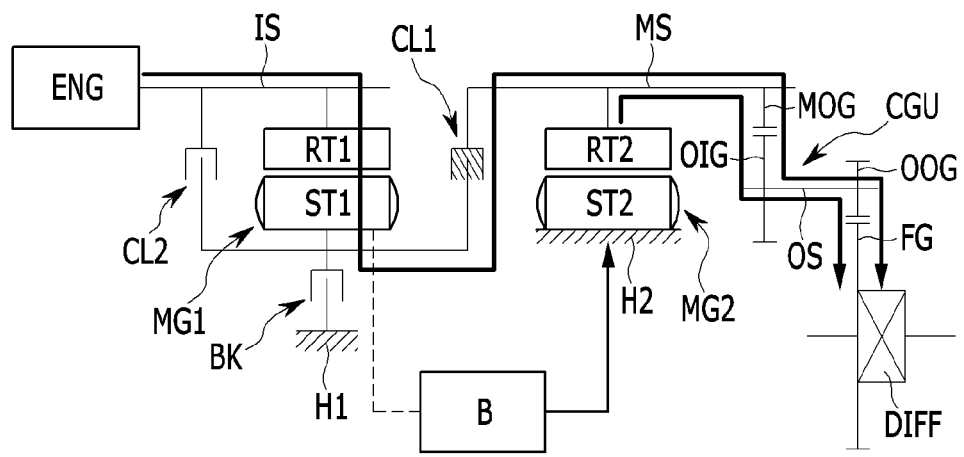
FIG. 7 is a schematic diagram for illustrating a power transmission path in a power transmission system according to an exemplary embodiment of the present invention when a battery is discharged at the HEV mode.
Figure 8:
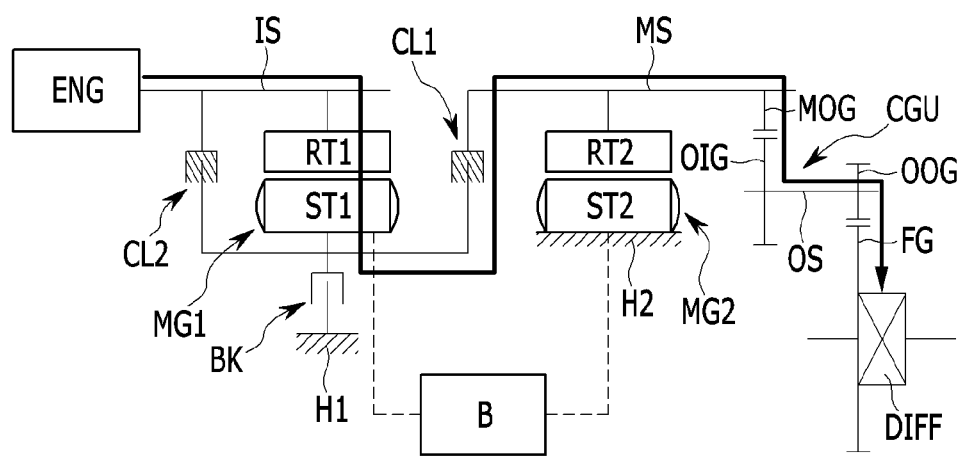
FIG. 8 is a schematic diagram for illustrating a power transmission path in a power transmission system according to an exemplary embodiment of the present invention at an engine mode.

If the rotational speed of the first stator ST1 is similar to that of the second rotor RT2 while the brake BK is released, the first clutch CL1 operates such that the torque of the engine ENG is transmitted to the final reduction gear FG of the differential apparatus DIFF through the first stator ST1, the intermediate shaft MS, and the speed reduction device CGU. If the battery B is charged at this state, as shown in FIG. 6, the electrical energy generated by the first motor/generator MG1 is transmitted to the battery B. In addition, if the battery B is discharged, as shown in FIG. 7, the electrical energy generated by the first motor/generator MG1 is not supplied to the battery B and the second motor/generator MG2 is driven by the battery B power.

In addition, if the rotational speed of the first stator ST1 is similar to that of the first rotor RT1, the second clutch CL2 operates such that the vehicle is driven only by the torque of the engine ENG.

According to the exemplary embodiment of the present invention, the EV mode can be achieved by using the second motor/generator MG2 in a state that the brake BK operates. If the engine ENG startes at this state, the first rotor RT1 of the first motor/generator MG1 drives by the electrical energy of the battery B.

In addition, after the engine ENG startes, the electrical energy generated at the first motor/generator MG1 by using the torque of the engine ENG is supplied to the second motor/generator MG2 through the electric path, and the second motor/generator MG2 drives.

After that, the brake BK is released, and the first clutch CL1 operates if the rotational speed of the first stator ST1 is similar to that of the second rotor RT2. Therefore, the torque of the engine is transmitted to the final reduction gear FG of the differential apparatus DIFF through the first stator ST1, the intermediate shaft MS, and the speed reduction device CGU so as to drive the vehicle.

In addition, the vehicle can be driven only by the torque of the engine ENG. Since loss occurring when mechanical energy is converted into electric energy can be reduced in this case, the fuel economy in vehicles may be improved.

While the present disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A power transmission system of a hybrid electric vehicle comprising:
   an input shaft configured to receive a torque of an engine;
   a first motor/generator including a first rotor directly connected to the input shaft and a first stator selectively connected to a first motor housing and the input shaft;
   an intermediate shaft disposed in series with the input shaft and selectively connected to the first stator;
   a second motor/generator including a second rotor directly connected to the intermediate shaft and a second stator directly connected to a second motor housing;
   a final reduction gear configured to receive a torque from the intermediate shaft and to output the torque; and
   a battery supplying electricity to the first and second motor/generators or charged by a torque of the first and second motor/generators.

2. The power transmission system of claim 1, further comprising:
   a brake disposed between the first stator and the first motor housing;
   a first clutch disposed between the first stator and the intermediate shaft; and
   a second clutch disposed between the input shaft and the first stator.

3. The power transmission system of claim 2, wherein the brake operates when the engine starts at an electric vehicle (EV) mode and at a series mode after the engine starts, the first clutch operates at a hybrid electric vehicle (HEV) mode, and the second clutch is operated at an engine mode.

4. The power transmission system of claim 1, further comprising a speed reduction device disposed between the intermediate shaft and the final reduction gear and transmitting the torque of the intermediate shaft to the final reduction gear.

5. The power transmission system of claim 4, wherein the speed reduction device comprises:
   an output shaft disposed in parallel with the intermediate shaft;
   an output shaft input gear fixedly connected to an end portion of the output shaft and engaged with an intermediate output gear fixedly connected to the intermediate shaft; and
   an output shaft output gear fixedly connected to the other end portion of the output shaft and engaged with the final reduction gear.

6. A power transmission system of a hybrid electric vehicle comprising:
   an input shaft configured to receive a torque of an engine;
   a first motor/generator including a first rotor directly connected to the input shaft and a first stator selectively connected to a first motor housing and the input shaft;
   an intermediate shaft disposed in series with the input shaft and selectively connected to the first stator;
   a second motor/generator including a second rotor directly connected to the intermediate shaft and a second stator directly connected to a second motor housing;
   a speed reduction device disposed in parallel with the intermediate shaft and configured to receive a torque of the intermediate shaft;
   a battery supplying electricity to the first and second motor/generators or charged by a torque of the first and second motor/generators; and
   a final reduction gear configured to receive the torque from the intermediate shaft through the speed reduction device and to output the torque.

7. The power transmission system of claim 6, further comprising:
   a brake disposed between the first stator and the first motor housing;
   a first clutch disposed between the first stator and the intermediate shaft; and
   a second clutch disposed between the input shaft and the first stator.

8. The power transmission system of claim 7, wherein the brake is operated when the engine starts at an electric vehicle (EV) mode and at a series mode after the engine starts, the first clutch operates at a hybrid electric vehicle (HEV) mode, and the second clutch operates at an engine mode.

9. The power transmission system of claim 6, wherein the speed reduction device comprises:
   an output shaft disposed in parallel with the intermediate shaft;

an output shaft input gear fixedly connected to an end portion of the output shaft and engaged with an intermediate output gear fixedly connected to the intermediate shaft; and an output shaft output gear fixedly connected to the other end portion of the output shaft and engaged with the final reduction gear.

10. The power transmission system of claim 3, wherein in the series mode, the first motor/generator operates as a generator by the torque of the engine and electrical energy is supplied to the second motor/generator through an electric path.

11. The power transmission system of claim 8, wherein in the series mode, the first motor/generator operates as a generator by the torque of the engine and electrical energy is supplied to the second motor/generator through an electric path.

* * * * *